UNITED STATES PATENT OFFICE.

DAVYDD C. G. HUGHES, OF CHICAGO, ILLINOIS.

ELECTRICALLY-HEATED UTENSIL.

1,185,673.  Specification of Letters Patent.  Patented June 6, 1916.

Application filed July 8, 1915. Serial No. 38,659.

*To all whom it may concern:*

Be it known that I, DAVYDD C. G. HUGHES, a citizen of the United States, residing at Chicago, in the county of Cook and State of Illinois, have invented certain new and useful Improvements in Electrically-Heated Utensils, of which the following is a specification.

My invention relates to improvements in electrically heated utensils, and more particularly to electrical heating means for incorporation in utensils, such as coffee-percolators, for instance, wherein liquid is to be heated and circulated.

One of the objects of my invention is to provide a heating structure that is simple in construction and may cheaply and easily be manufactured; that is efficient in operation and arranged to effect a very advantageous utilization of the electrically-generated heat; that is advantageously combined with a utensil-supporting base; that is effectively protected against getting out of order or unduly deteriorating under severe conditions of use; and that is susceptible of embodiment in connection with utensils already constructed for extraneous, non-electrical heating, to convert such utensils into electrically heated devices.

It will become apparent to those skilled in the art from the following description that structures embodying my invention are susceptible of wide variation of form, and details of construction and arrangement and that such embodiments may be employed in utensils varying widely in particular construction and in intended use, but a particularly advantageous embodiment of my invention is in the construction of coffee percolators, or more especially in the conversion of stove-heated percolators into electrically heated percolators, and therefore, for purposes of a full disclosure of my invention, in a single embodiment, I will illustrate and describe its application to such percolator construction, and may hereinafter claim, in some claims, the advantageous combinative association of my heating structure with features of percolator construction; but it will be understood that in its broader aspects I do not intend to limit my invention to the exact construction or the particular use illustratively selected.

Figure 1:
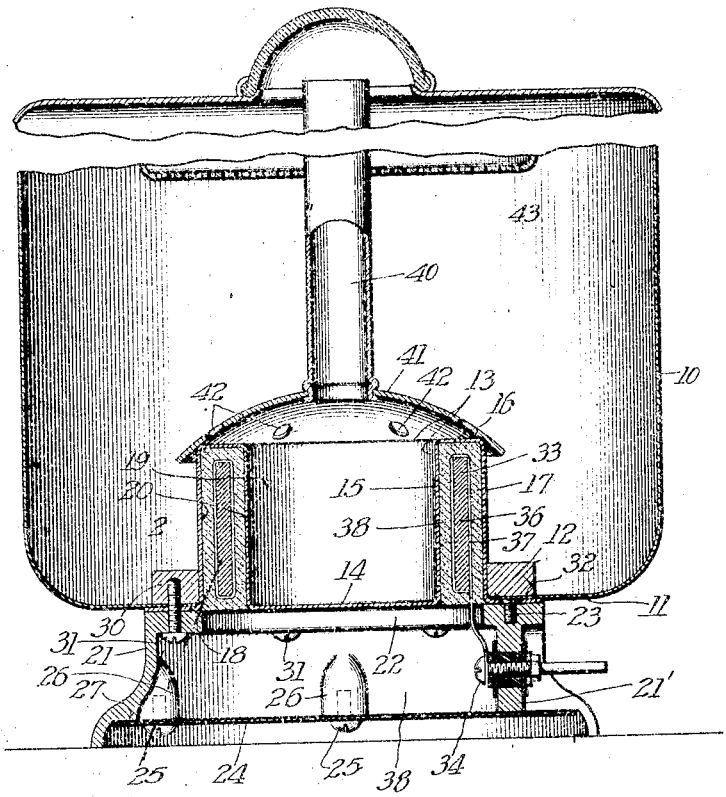
Figure 2:
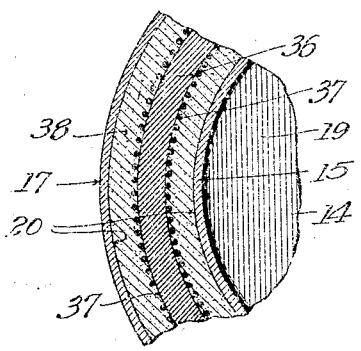
Figure 3:
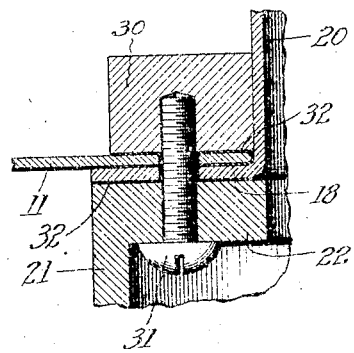

In the drawings Figure 1 is a central vertical section through a utensil constructed in accordance with my invention, said view illustrating, schematically, some features typical of well known coffee percolator construction. Fig. 2 is a section on line 2—2 of Fig. 1, and Fig. 3 is an enlarged vertical section showing details of preferred specific construction.

In the drawing 10 indicates in general a receptacle body preferably of metal or with a metal foundation, having a bottom 11 to which the heating structure and the stand or support are to be attached. To the bottom 11 I connect an inwardly opening cup member 13, preferably of thin metal, and preferably shaped to provide in an integral structure a bottom 14, an inner wall 15 forming the periphery of inwardly opening cup-well, an annular crown wall 16, an outer wall 17 concentric with and spaced apart from wall 15, and an outwardly bent flange 18 that is preferably in substantially the plane of the bottom 14. While such a cup, with its inwardly opening well 19 and its outwardly opening channel 20 in its hollow wall, might be formed integral with the wall of the vessel, in original construction, or mounted with its flange resting on the inside of the utensil bottom I prefer, especially in converting stove-heated percolators into "electrics", to cut in the utensil-bottom an opening 12, in which the outer wall of the cup neatly fits so that the flange 18 underlies the bottom of the utensil, bordering the hole 12. For best embodiments of my invention for many purposes, this cup structure is preferably permanently associated with a base that affords support to the utensil and that is shown as a flared hollow casting 21 having a top ring 22 for coöperation with the flange 18. This base is secured in fixed relation to the cup flange as by screws 23, and preferably has its bottom sealed water-tight by a cover plate 24. In detail, such construction may, of course, be varied, but as herein shown the cover 24 is secured by screws 25 that take into ears 26 on the base casting, against the shoulder 27 inset somewhat in the bearing bottom edge of the base.

For attaching the metallic structure to the utensil bottom 11 I preferably invest the heater cup with an anchor ring 30, resting on the utensil bottom and I insert screws 31 taking through the parts 22, 18 and 11 into said ridge 30. Sealing material 32 may be interposed between all the contacting surfaces of these parts, it being my preference in commercial practice to coat the interfitting part with suitable paint or enamel during the course of their assemblage and allow it to dry and harden before use.

The heating element 33 is made of annular form to fit in the channel 20 of the hollow wall cup, and to receive the extremities of the heating wire the insulated binding posts 34 are sealed in the peripheral wall of the base 21, said wall being preferably flattened at the portion 21' for convenient positioning of said binding posts. In the particular construction shown I prefer that the heating element comprise a core 36 made of an asbestos strip, bent into annular form and carrying the spirally wound resistance wire 37, this wire-carrying core being spaced apart from the concentric metallic wall of the cup in all directions and secured therein in its spaced relation by being embedded in a mass 38 of insulating material, molded in the channel in a plastic condition and caused to harden therein for self-retention.

Of course in assembling the construction specifically illustrated, the heating element is first incorporated in the cup wall, the cup is then mounted on the base and the resistance wire connected to the base terminal, then the cup and base is secured to the utensil bottom and the anchor ring 30, and lastly the protective cover 24 is applied. When thus constructed, it will be apparent that the sealed chamber 38 within the base constitutes a closed air space that is protected against ingress of water when the utensil is being washed, and that serves also to resist dissipation of the heat downward through the base.

In the embodiment of my invention in a percolator, the percolator-tube 40, conventionally shown, carries at its bottom end an arched hood 41 that overlies, contacts with, and centers upon the cup wall, and that preferably has relatively small openings 42 spaced at intervals near its periphery so as to be close to the open top of the cup, preferably directly above crown wall 16. Of course the size of the openings 42 are proportioned to the size of well 19 and the desired rate of liquid flow, and to the area of the tube that delivers the heated liquid to percolate through the properly positioned coffee container 43. The part 43 and other structure near the top of Fig. 1 merely represents generically any suitable percolator arrangement and it will be unnecessary to describe in detail the arrangement of such parts suggestively shown, as these features of construction may take any one of many well known forms.

A percolator equipped with water heating and circulating means as above described has, among its advantages due to my invention, the advantage of beginning its percolating action very quickly, causing the discharge, through the percolator tube 40, of water that is far below boiling temperature.

It will be observed that the heating element offers a very large proportion of its effective surface for contact with the water, for economy and efficiency in operation. Within the well 19 there is, of course, a tendency to internal circulation that will cause the water to ascend along the inner wall 15 of the heat and to descend centrally; and externally to the heater cup there is also a circulation tendency such that the cool water tends to descend near the outer wall of the receptacle 10 and to flow upwardly in proximity to the outer heater wall 17. Consequently the water that flows into the well 19 through the top aperture 42, when the device is in operation, is preheated water of nearly the maximum temperature available outside of the well. The small portion of water contained in well 19 of course heats up rapidly, and against walls 15 steam is quickly generated that, seeking escape through pipe 40, causes the percolating action to begin very early in point of time of operation while the main body of water around the tube 40 is still cool and so tends to lower the temperature of the water expelled through tube 40 that the drops actually expelled through the upper end of tube 40 are of relatively low temperature. I regard this as very advantageous in a coffee percolator, in that it is generally regarded as true that the coffee is of best flavor if the temperature of the water that is first passed through the coffee-mass be relatively low.

Having described my invention, what I claim is:—

1. An electric heating structure for a utensil having a perforation in the bottom thereof comprising a heater cup having a hollow peripheral wall, an electric heating element contained in said hollow wall, and means for attachment of said cup to the marginal portion of the perforation in the utensil bottom, said cup projecting through the perforation into the interior of the utensil.

2. The combination with an electrically-heated utensil having a perforation in the bottom thereof, of a metal cup having a double peripheral wall projecting through the perforation providing an upwardly opening central well communicating with the interior of the utensil and downwardly opening channel, said channel opening to the exterior of the utensil, and an electrical heating element disposed in said channel.

3. A heating unit for utensils comprising a one piece metal cup having a base and upstanding double peripheral walls forming an outwardly opening channel around an inwardly opening well, and having a peripheral flange at its bottom; and an electric heating-coil in said channel.

4. A heating unit, for insertion in a utensil that has a bottom perforation, comprising a metal cup having a base and upstanding double peripheral walls, forming an upwardly opening well and a downwardly opening channel, said cup having an outwardly extending flange for connection with the marginal portion of the perforation in the utensil bottom, and an electrical heating element arranged in said channel.

5. An electric heating structure for insertion through a perforation in a utensil bottom and attachment thereto, comprising in combination, a double walled cup providing an upwardly opening well and a downwardly opening channel, and having a border flange, an electrical heating element in said channel, a base structure to underlie the flange, and fastening means appropriate to connect the utensil bottom, the flange and the base together.

6. An electric heating structure for insertion through a perforation in a utensil bottom and attachment thereto, comprising in combination, a double walled cup providing an upwardly opening well and a downwardly opening channel, and having a border flange, an electrical heating element in said channel, a base structure to underlie the flange, said base having a closed bottom, and fastening means appropriate to connect the utensil bottom, the flange and the base together.

An electric heating structure for insertion through a perforation in a utensil bottom and attachment thereto, comprising in combination, a double walled cup providing an upwardly opening well and a downwardly opening channel, and having a border flange, an electrical heating element in said channel, a base structure to underlie the flange, said base provided with a removable bottom closure, and carrying laterally projecting binding posts connected with the heating element, and fastening means appropriate to connect the utensil bottom, the flange and the base together.

8. In a percolator, a vessel having in its bottom a cup with a double peripheral wall containing in its channel an electrical heating element, said cup closed at its bottom, and a hood having openings near its edge, overlying said cup and communicating with a percolator tube.

In testimony whereof I hereunto set my hand in the presence of two subscribing witnesses.

DAVYDD C. G. HUGHES.

In the presence of—
STANLEY W. CORK,
MARY F. ALLEN.